United States Patent [19]
Fukada

[11] Patent Number: 6,107,557
[45] Date of Patent: *Aug. 22, 2000

[54] CHORD DISPLAY APPARATUS AND STORAGE MEDIUM

[75] Inventor: Ayumi Fukada, Hamamatsu, Japan

[73] Assignee: Yamaha Corporation, Hamamatsu, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/276,440

[22] Filed: Mar. 25, 1999

[30] Foreign Application Priority Data

Aug. 31, 1998  [JP]  Japan  .................................. 10-246150

[51] Int. Cl.[7] .............................. G09B 15/02; G10D 3/04
[52] U.S. Cl. ..................... 84/485 R; 84/318; 84/DIG. 22
[58] Field of Search ................................. 84/318, 485 R, 84/485 S, DIG. 22

[56] References Cited

U.S. PATENT DOCUMENTS 4,763,558  8/1988  Johnson .
5,396,828  3/1995  Farrand .

FOREIGN PATENT DOCUMENTS 2713053  10/1997  Japan .

*Primary Examiner*—Stanley J. Witkowski
*Attorney, Agent, or Firm*—Morrison & Foerster

[57] ABSTRACT

A chord display apparatus for use with a musical instrument is provided, which displays chords so as to enable the player to give diversified performance, and a storage medium that stores such a chord display program. Sequence data are stored in a storage device, which comprise a plurality of data including at least chord data that are arranged in accordance with a predetermined chord progression are sequentially read out. A first operating manner, which is a standard manner of operating the playing elements of the musical instrument so as to produce a chord represented by the chord data, is determined when each of the chord data is read out and displayed by a display device. The storage device stores operating manner data that indicates a second operating manner different from the first operating manner, such that the operating manner data is associated with the chord data. The second operating manner indicated by the operating manner data is determined as an operating manner for producing the chord represented by the chord data, when the operating manner data is read out in association with the read chord data. The determined second operating manner is displayed by the display device.

21 Claims, 8 Drawing Sheets

CHORD DISPLAY APPARATUS AND STORAGE MEDIUM

BACKGROUND OF THE INVENTION

1. Field of the Invention

The present invention relates to a chord display apparatus that displays musical chords to be produced by a musical instrument, and a storage medium that stores a chord display program.

2. Prior Art

A known example of chord display apparatus for displaying chords in a musical instrument is disclosed in Japanese Patent No. 2713053.

The chord display apparatus disclosed in the above-identified patent is constructed such that chord data that are sequentially stored in accordance with the chord progression, and time data that indicates the performance duration, are sequentially read in accordance with the progression of the song, so that the apparatus displays the performance duration of a chord that is to be played next, the content of the chord (specifically, chord name), the performance duration of a chord that follows the above chord, and the content of the chord.

In the known chord display apparatus described above, however, only the chord names are displayed. When a player actually plays the musical instrument to produce a chord displayed on the apparatus, the resulting performance tends to monotonous if the player knows only one (or a few) manner(s) of pressing strings of the instrument for producing a chord, with respect to each chord name. More specifically, the performance is given without taking account of linkage of sounds upon changes of chords, echo (reverberation) of sound that depends upon voicing, and other factors.

In some cases, a large number of chords including many notes with ♯ or ♭ appear in a song, depending upon the key of the song, and it was difficult for beginners to play such a song (chords).

When a song is sung to the accompaniment of a musical instrument, for example, it may be desired to change the key of the song. Upon a change of the key, however, the player may not be able to immediately understand how to press the strings of the musical instrument to produce chords that are also changed in accordance with the change of the key.

SUMMARY OF THE INVENTION

It is a first object of the invention to provide a chord display apparatus that displays chords so as to enable the player to give diversified performance, and a storage medium that stores such a chord display program.

A second object of the invention is to provide a chord display apparatus that displays chords that can be easily played by even a beginner, and a storage medium that stores such a chord display program.

A third object of the invention is to provide a chord display apparatus that displays chords so that the player can immediately understand how to produce the chords even when the key is changed.

To attain the first object, in a first aspect of the invention, there is provided a chord display apparatus for use with a musical instrument including a plurality of playing elements, comprising a storage device that stores sequence data comprising a plurality of data including at least chord data that are arranged in accordance with a predetermined chord progression, a reading device that sequentially reads each data of the sequence data stored in the storage device, a determining device that determines a first operating manner when each of the chord data is read by the reading device, the first operating manner being a standard manner of operating the playing elements of the musical instrument so as to produce a chord represented by the chord data, and a display device that displays the first operating manner determined by the determining device, wherein the storage device stores operating manner data that indicates a second operating manner different from the first operating manner, such that the operating manner data is associated with the chord data, wherein the determining device determines the second operating manner indicated by the operating manner data, as an operating manner for producing the chord represented by the chord data, when the operating manner data is read in association with the chord data read by the reading device, and wherein the display device displays the second operating manner determined by the determining device.

According to the first aspect of the invention, the operating manner data indicating the operating manner different from the standard manner of operating the playing element of the electronic musical instrument for producing a chord is stored in association with the chord when necessary. When the operating manner data is read, the manner of operating the playing element of the electronic musical instrument for producing the chord is changed to the operating manner indicated by the operating manner data, and the thus determined operating manner is displayed. Accordingly, the player is able to give a diversified performance even if he/she does not know many manners of operating the playing element with respect to each chord name.

While the chord data mentioned herein typically represents a chord name, the chord data may comprise data representing the standard manner of operating the playing element to produce the relevant chord, or may comprise composite data of operating manner data and chord name data. While the determining device may employ various manners to determine the standard manner of operating the playing element so as produce a chord, data indicative of the standard manner of operating the playing element for each chord may be stored as table data, and, when certain chord data is read out, the corresponding standard manner of operating the playing element is determined by searching it from the table data. As another manner, when certain chord data is read out, the corresponding standard manner of operating the playing element is determined only based on the chord data, or by computing along with other information (such as the key of the song). This applies to the other aspects of the invention as described below.

In a preferred form of the first aspect, there is provided a chord display apparatus for use with a musical instrument including a plurality of strings and a capotasto, comprising a storage device that stores sequence data comprising a plurality of data including at least chord data that are arranged in accordance with a predetermined chord progression, a reading device that sequentially reads each data of the sequence data stored in the storage device, a determining device that determines a first string-depression manner of pressing the strings when each of the chord data is read by the reading device, the first string-depression manner being a standard manner of pressing the strings of the musical instrument so as to produce a chord represented by the chord data, and a display device that displays the first string-depression manner determined by the determining device, wherein the storage device stores string-depression manner data that indicates a second string-depression manner different from the first string-depression manner, such that the string-depression manner data is associated with the chord data, wherein the determining device determines the second string-depression manner indicated by the string-depression manner data, as a string-depression manner for producing the chord represented by the chord data, when the string-depression manner data is read in association with the chord data read by the reading device, and wherein the display device displays the second string-depression manner determined by the determining device.

To attain the second object, in a second aspect of the invention, there is provided a chord display apparatus for use with a musical instrument including a plurality of playing elements, comprising a storage device that stores sequence data comprising a plurality of data including at least chord data that are arranged in accordance with a predetermined chord progression, a reading device that sequentially reads each data of the sequence data stored in the storage device, a determining device that determines a first operating manner when each of the chord data is read by the reading device, the first operating manner being a standard manner of operating the playing elements of the musical instrument so as to produce a chord represented by the chord data, and a display device that displays the first operating manner determined by the determining device, wherein the storage device stores recommended capotasto position data that indicates a recommended capotasto position on the musical instrument, wherein the determining device changes the first operating manner as an operating manner for producing the chord represented by the chord data read by the reading device, to a second operating manner that is determined based on the recommended capotasto position, so as to provide a chord that can be easily played by a player, and, wherein the display device displays the second operating manner obtained by the determining device.

According to the second aspect of the invention, the recommended capotasto position data that designates the recommended capotasto position is stored, and, when the recommended capotasto position data is read out, the standard manner of operating the playing elements of the musical instrument for producing a chord is changed to another manner of operating the playing elements for producing a chord (including as few notes with ♯ or ♭ as possible) that can be easily played by a player, and the thus determined operating manner is displayed. Thus, the apparatus is able to present chords that can be easily played by the player even if he/she is a beginner.

Here, the manner of operating the playing elements of the musical instrument in which the player can easily play a chord means the manner of operating the playing elements for producing a chord consisting of notes to which no or a few number of ♯ or ♭ are attached. Where a large number of ♯ or ♭ are attached to the constituent notes of the chord corresponding to the chord data read by the reading device, it is generally difficult for the player to perform the standard manner of operating the playing elements that is determined by the determining device, and therefore the chord is changed to a simpler chord having the least number of notes with ♯ or ♭, thus presenting an easier manner of operating the playing elements so that the player can easily play the chord. This also applies to the other aspects of the invention.

In a preferred form of the second aspect, there is provided a chord display apparatus for use with a musical instrument including a plurality of strings and a capotasto, comprising a storage device that stores sequence data comprising a plurality of data including at least chord data that are arranged in accordance with a predetermined chord progression, a reading device that sequentially reads each data of the sequence data stored in the storage device, a determining device that determines a first string-depression manner of pressing the strings when each of the chord data is read by the reading device, the first string-depression manner being a standard manner of pressing the strings of the musical instrument so as to produce a chord represented by the chord data, and a display device that displays the first string-depression manner determined by the determining device, wherein the storage device stores recommended capotasto position data that indicates a recommended capotasto position on the musical instrument, wherein the determining device changes the first string-depression manner as the standard manner of pressing the strings so as to produce the chord represented by the chord data read by the reading device, to a second string-depression manner that is determined based on the recommended capotasto position, so as to provide a chord that can be easily played by a player, and wherein the display device displays the second string-depression manner obtained by the determining device.

To attain second object, in a third aspect of the invention, there is provided a chord display apparatus for use with a musical instrument including a plurality of playing elements, comprising a storage device that stores sequence data comprising a plurality of data including at least key data indicative of a key, and chord data that are arranged in accordance with a predetermined chord progression, a reading device that sequentially reads each data of the sequence data stored in the storage device, a determining device that determines a first operating manner when each of the chord data is read by the reading device, the first operating manner being a standard manner of operating the playing elements of the musical instrument so as to produce a chord represented by the chord data, and a display device that displays the first operating manner determined by the determining device, and a calculating device that calculates a recommended position of the capotasto of the musical instrument when the key data is read, so that chords formed based on the recommended capotasto position can be easily played by a player, in accordance with a key represented by the key data, wherein the determining device changes the first operating manner as an operating manner for producing the chord represented by the chord data read by the reading device, to a second operating manner that is determined based on the recommended capotasto position, so that the player is able to easily play each chord in the second operating manner, and wherein the display device displays the second operating manner obtained by the determining device.

According to the third aspect of the invention, the key data indicative of a key is stored, and, when the key data is read out, the recommended capotasto position is calculated so as to provide chords that match the key and can be easily played by the player. The standard manner of operating the playing elements of the musical instrument is then changed to another operating manner that is determined based on the recommended capotasto position, to provide a chord that can be easily played by a player, and the thus determined operating manner is displayed. Namely, where the recommended capotasto position data is not stored, the recommended capotasto position is determined based on the stored key data, and each of the original chords is changed to another chord constituted by notes with the least number of ♯ and ♭, which chord is then displayed. Thus, the present apparatus is able to present chords than can be easily played by the player even if he/she is a beginner.

In a preferred form of the third aspect, there is provided a chord display apparatus for use with a musical instrument including a plurality of strings and a capotasto, comprising a storage device that stores sequence data comprising a plurality of data including at least key data indicative of a key, and chord data that are arranged in accordance with a predetermined chord progression, a reading device that sequentially reads each data of the sequence data stored in the storage device, a determining device that determines a first string-depression manner of pressing the strings when each of the chord data is read by the reading device, the first string-depression manner being a standard manner of pressing the strings of the musical instrument so as to produce a chord represented by the chord data, a display device that displays the first string-depression manner determined by the determining device, and a calculating device that calculates a recommended position of the capotasto of the musical instrument when the key data is read, so that chords formed based on the recommended capotasto position can be easily played by a player, in accordance with a key represented by the key data, wherein the determining device changes the first string-depression manner as the standard manner of pressing the strings, to a second string-depression manner that is determined based on the recommended capotasto position, so that the player is able to easily play each chord in the second string-depression manner, and wherein the display device displays the second string-depression manner obtained by the determining device.

To attain the third object, in a fourth aspect of the invention, there is provided a chord display apparatus for use with a musical instrument including a plurality of strings and a capotasto, comprising a storage device that stores sequence data comprising a plurality of data including at least key data indicative of a key, and chord data that are arranged in accordance with a predetermined chord progression, a reading device that sequentially reads each data of the sequence data stored in the storage device, a display device that displays a chord based on the chord data read by the reading device, a capotasto position supplying device that supplies a capotasto position of the musical instrument, which changes the chord data read by the reading device, into a chord that can be easily played by a player, a key changing device that changes the key data read by the reading device, into another key that is directed by the player, a performance key determining device that determines a performance key based on the key data read by the reading device, and the capotasto position supplied by the capotasto position supplying device, a capotasto position changing device that changes the supplied capotasto position, to another capotasto position that matches the key data changed by the key changing device and the performance key determined by the performance key determining device, when the key data is changed by the key changing device, and a modifying device that modifies the chord data read by the reading device, based on the key data read by the reading device, the key data changed by the key changing device, and the capotasto position changed by the capotasto position changing device, wherein the display device displays a chord based on the chord data modified by the modifying device.

According to the fourth aspect of the invention, the capo position is automatically changed when the key of the song is changed, and therefore the player is able to play each chord in the same operating manner as that before the key is changed.

To attain the first object, in a fifth aspect of the invention, there is provided a chord display apparatus for use with a musical instrument including a plurality of strings and a capotasto, comprising a storage device that stores sequence data comprising a plurality of data including at least key data indicative of a key, and chord data that are arranged in accordance with a predetermined chord progression, a reading device that sequentially reads each data of the sequence data stored in the storage device, a display device that displays a chord based on each of the chord data read by the reading device, a capotasto position supplying device that supplies a capotasto position of the musical instrument, which changes the chord data read by the reading device, into another chord that can be easily played by a player, a performance key determining device that determines a performance key based on the key data read by the reading device, and the capotasto position supplied by the capotasto position supplying device, a capotasto position changing device that changes the capotasto position supplied by the capotasto position supplying device, to a capotasto position that is directed by the player, a performance key changing device that changes the performance key determined by the performance key determining device, to a performance key that matches the capotasto position changed by the capotasto position changing device and the key data read by the reading device, when the capotasto position is changed by the capotasto position changing device, and a modifying device that modifies the chord data read by the reading device, based on the key data read by the reading device, and the capotasto position changed by the capotasto position changing device, wherein the display device displays a chord based on the chord data modified by the modifying device.

According to the fifth aspect of the invention, the performance key is automatically changed when the capotasto position is changed, and therefore the player is able to play each chord in a different string-depression manner from that before the capotasto position is changed, while maintaining the same key.

To attain the first object, in a sixth aspect of the invention, there is provided a chord display apparatus for use with a musical instrument including a plurality of strings and a capotasto, comprising a storage device that stores sequence data comprising a plurality of data including at least key data indicative of a key, and chord data that are arranged in accordance with a predetermined chord progression, a reading device that sequentially reads each data of the sequence data stored in the storage device, a display device that displays a chord based on each of the chord data read by the reading device, a capotasto position supplying device that supplies a capotasto position of the musical instrument, which changes the chord data read by the reading device, into a chord that can be easily played by a player, a performance key determining device that determines a performance key based on the key data read by the reading device, and the capotasto position supplied by the capotasto position supplying device, a performance key changing device that changes the performance key determined by the performance key determining device, to a performance key that is directed by the player, a capotasto position changing device that changes the capotasto position supplied by the capotasto position supplying device, to a capotasto position that matches the performance key changed by the performance key changing device and the key data read by the reading device, when the performance key is changed by the performance key changing device, and a modifying device that modifies the chord data read by the reading device, based on the key data read by the reading device, and the capotasto position changed by the capotasto position changing device, wherein the display device displays a chord based on the chord data modified by the modifying device.

According to the sixth aspect of the invention, the capotasto position is automatically changed when the performance key is changed, and therefore the player is able to produce each chord in a different string-depression manner from that before the performance key is changed, while maintaining the same key.

To attain the first object, in a seventh aspect of the invention, there is provided a storage medium storing a program that is executable by a computer to implement a chord display method for a musical instrument including a plurality of playing elements, the program comprising a reading module that sequentially reads each data of sequence data stored in a storage device, the sequence data comprising a plurality of data including at least chord data that are arranged in accordance with a predetermined chord progression, a determining module that determines a first operating manner when each of the chord data is read by the reading device, the first operating manner being a standard manner of operating the playing elements of the electronic instrument so as to produce a chord represented by the chord data, and a display module that displays the first operating manner determined by the determining module, wherein the storage device stores operating manner data that indicates a second operating manner different from the first operating manner, such that the operating manner data is associated with the chord data, wherein the determining module determines the second operating manner indicated by the operating manner data, as an operating manner for producing the chord represented by the chord data, when the operating manner data is read in association with the chord data read by the reading device, and wherein the display module displays the second operating manner determined by the determining module.

To attain the second object, in an eighth aspect of the invention, there is provided a storage medium storing a program that is executable by a computer to implement a chord display method for a musical instrument including a plurality of playing elements, the program comprising a reading module that sequentially reads each data of sequence data stored in a storage device, the sequence data comprising a plurality of data including at least chord data that are arranged in accordance with a predetermined chord progression, a determining module that determines a first operating manner when each of the chord data is read by the reading module, the first operating manner being a standard manner of operating the playing elements of the musical instrument so as to produce a chord represented by the chord data, and a display module that displays the first operating manner determined by the determining module, wherein the storage device stores recommended capotasto position data that indicates a recommended capotasto position on the musical instrument, wherein the determining module changes the first operating manner as an operating manner for producing the chord represented by the chord data read by the reading module, to a second operating manner that is determined based on the recommended capotasto position, so as to provide a chord that can be easily played by a player, and wherein the display module displays the second operating manner obtained by the determining module.

To attain the second object, in a ninth aspect of the invention, there is provided a storage medium storing a program that is executable by a computer to implement a chord display method for a musical instrument including a plurality of playing elements, the program comprising a reading module that sequentially reads each data of sequence data stored in a storage device, the sequence data comprising a plurality of data including at least key data indicative of a key, and chord data that are arranged in accordance with a predetermined chord progression, a determining module that determines a first operating manner when each of the chord data is read by the reading module, the first operating manner being a standard manner of operating the playing elements of the musical instrument so as to produce a chord represented by the chord data, and a display module that displays the first operating manner determined by the determining module, and a calculating module that calculates a recommended position of the capotasto of the musical instrument when the key data is read, so that chords formed based on the recommended capotasto position can be easily played by a player, in accordance with a key represented by the key data, wherein the determining module changes the first operating manner as an operating manner for producing the chord represented by the chord data read by the reading module, to a second operating manner that is determined based on the recommended capotasto position, so that the player is able to easily play each chord in the second operating manner, and wherein the display module displays the second operating manner obtained by the determining device.

The above and other objects, features, and advantages of the invention will become more apparent from the following detailed description taken in conjunction with the accompanying drawings.

DETAILED DESCRIPTION OF THE PREFERRED EMBODIMENT

The invention will be described in detail with reference to the accompanying drawings showing a preferred embodiment thereof.

Figure 1:
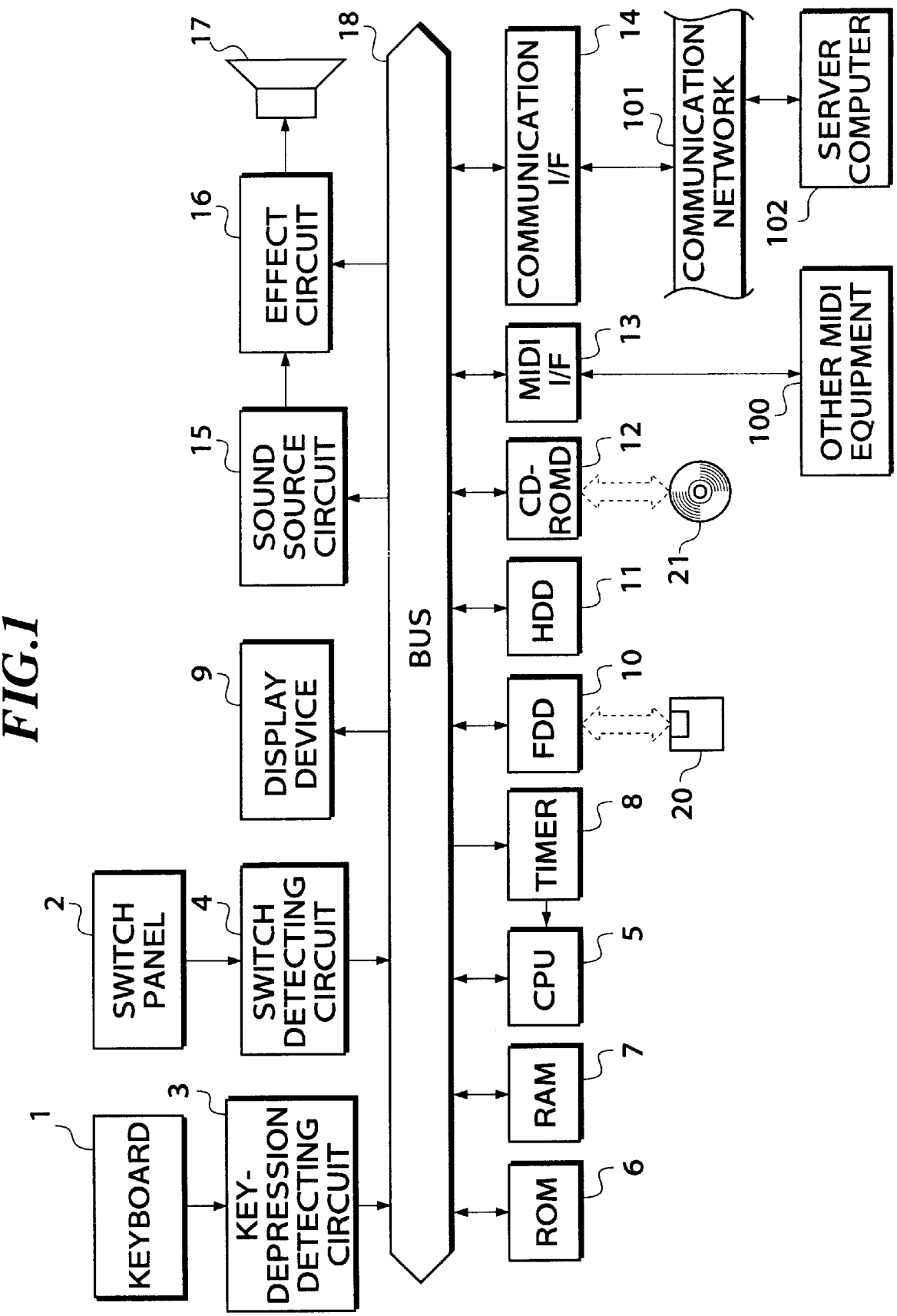
FIG. 1 is a block diagram schematically showing the construction of a chord display apparatus constructed according to one embodiment of the present invention.

FIG. 1 schematically shows the construction of a chord display apparatus according to one embodiment of the invention. The chord display apparatus is adapted to display chords to be played with a six-stringed guitar, and string-depression positions at which the fingers are placed on the strings of the guitar so as to produce the chords.

As shown in FIG. 1, the chord display apparatus of the present embodiment includes a keyboard 1 through which pitch information is entered, a switch panel 2 including a plurality of switches with which various kinds of information are entered, a key-depression detecting circuit 3 that detects the operated state of each key on the keyboard 1, and a switch detecting circuit 4 that detects the operated or depressed state of each switch on the switch panel 2. The chord display apparatus also includes CPU 5 that governs control of the whole apparatus, ROM 6 that stores control programs to be executed by the CPU 5, and various kinds of table data including a chord table in which the most typical string-depression positions for each chord type are described, RAM 7 that temporarily stores performance data, various input information, and operation results, and a timer 8 that counts interrupt time for timer interrupt processing, and various periods of time or durations. The chord display apparatus further includes a display device 9 for displaying various kinds of information, which includes, for example, a large-sized liquid crystal display (LCD) or CRT (cathode ray tube) display, and light emitting diodes (LED), a floppy disc drive (FDD) 10 for driving a floppy disc (FD) 20 as one type of storage medium, a hard disc drive (HDD) 11 for driving a hard disc, not shown, that may store various application programs including the above control programs, and various types of data, and a CD-ROM drive (CD-ROMD) 12 for driving a CD-ROM (compact disc—read only memory) 21 that may store various application programs including the above control programs, and various kinds of data. The apparatus further includes a MIDI interface (I/F) 13 that receives MIDI (Musical Instrument Digital Interface) signals from external devices or equipment, and generates MIDI signals to the external devices or equipment, a communication interface (I/F) 14 that transmits and receives data to and from a server computer 102, or the like, through a communication network 101, a sound source circuit 15 that converts performance data entered through the keyboard 1, preset performance data, or the like, into musical tone signals, an effect circuit 16 that gives various sound effects to the tone signals received from the sound source circuit 15, and a sound system 17 that converts the tone signals received from the effect circuit 16, into actual sound. The sound system 17 may be comprised of a DAC (Digital-to-Analog Converter), an amplifier, a loudspeaker, or the like.

The above-described components 3 through 16 are connected with each other through a bus 18. In addition, the timer 8 is connected to the CPU 5, and other MIDI equipment 100 is connected to the MIDI I/F 13, while the communication network 101 is connected to the communication I/F 14. Also, the effect circuit 16 is connected to the sound source circuit 15, and the sound system 17 is connected to the effect circuit 16.

As described above, the hard disc set in the HDD 11 may store control programs to be executed by the CPU 5. Where a certain control program is not stored in the ROM 6, the hard disc may store the control program, which is read into the RAM 7 so that the CPU 5 can perform the same operation as in the case where the control program is stored in the ROM 6. This arrangement makes it easy to add a new control program or upgrade the version of an existing program.

A control program or various data may be read from the CD-ROM 21 set in the CD-ROM drive 12, and stored into the hard disc within the HDD 11. This arrangement makes it easy to install a new control program, or upgrade the version of an existing program. The present apparatus may be provided with other external storage devices, such as a magneto-optic disc (MO) device, that utilize various forms of storage media, in addition to or in place of the CD-ROM drive 12.

The MIDI I/F 13 need not be an exclusive or dedicated interface, but may be provided by a general-purpose interface, such as RS-232, USB (Universal Serial Bus), or IEEE 1394. In this case, the MIDI I/F 13 may transmit or receive data other than MIDI messages, at the same time that it transmits or receive the MIDI data.

As described above, the communication I/F 14 is connected to the communication network 101, such as LAN (Local Area Network), Internet, or a telephone line, so as to be connected to the server computer 102 via the communication network 101. In the case where a certain program or a certain set of parameters is not stored in the hard disc within the HDD 11, the communication I/F 14 may be used for downloading the program or parameters from the server computer 102. A client computer (i.e., chord display apparatus in the present embodiment) sends a command to the server computer 102 via the communication I/F 14 and communication network 101, to request downloading of a desired program or parameters. Upon receipt of the command, the server computer 102 delivers the requested program or set of parameters to the client computer, through the communication network 101. The client computer then receives the program or set of parameters through the communication I/F 13, and stores it in the hard disc within the HDD 11. In this manner, downloading is accomplished.

It is also possible to provide another interface for transmitting and receiving data directly to and from an external computer, or the like.

Since the chord display apparatus of the present embodiment is adapted to display chords to be played with the six-stringed guitar, as described above, the keyboard 1 and the key-depression detecting circuit 3 are not essential components of the apparatus. Thus, these components 1, 3 may be eliminated from the apparatus. While the chord display apparatus of the present embodiment is constructed on a general-purpose personal computer, as is understood from its configuration as described above, it may be constructed on an exclusive or dedicated device that consists only of the minimum components required to practice the present invention.

Figure 2:
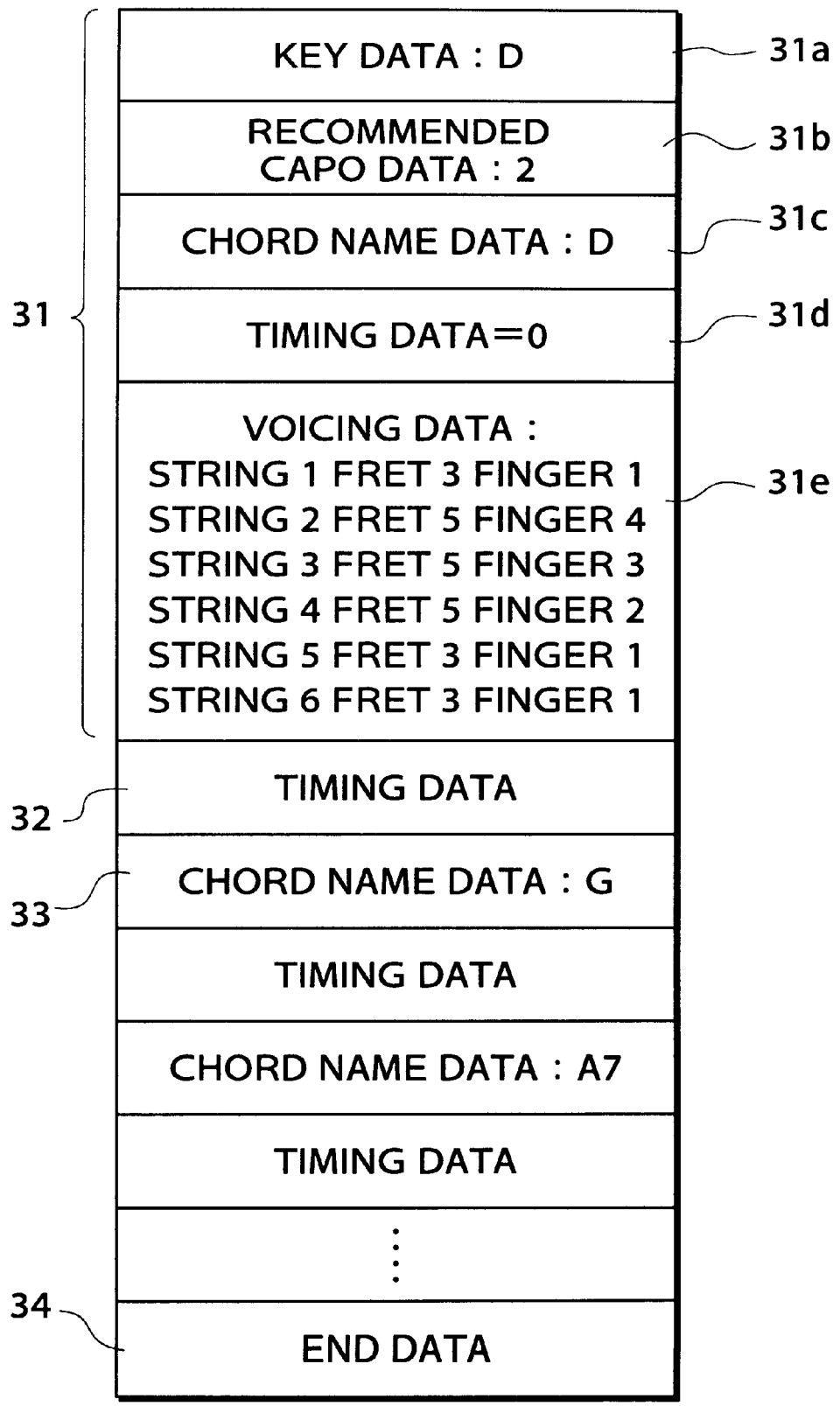
FIG. 2 is a view showing a data format of chord progression data.

FIG. 2 shows one example of a data format of chord progression data.

As shown in FIG. 2, the chord progression data is mainly formed of header data 31, timing data 32 that indicates the timing of reading data that is located immediately after the timing data 32, chord name data 33, and end data 34 that indicates the end of the chord progression data.

The header data 31 is formed of key data 31a that represents the musical key of the chord progression data, recommended capo position data 31b that indicates a recommended position at which a capotasto (hereinafter abbreviated to "capo") is attached to the neck of the guitar, head chord name data 31c that represents the chord name that is first displayed, timing data 31d whose data value is "0", and voicing data 31e that gives instructions as to which finger is to be placed on each string at a given fret position on the finger-board. While the set of the data 31a–31e is generically called "header data", for the sake of the brevity, only a part of these data (for example, data 31a and 31b) may be called header data, or the set of data 31a–31e may be called otherwise.

In the presence of both of chord name data and voicing data that are read out at the same time (for example, head chord name data 31c and voicing data 31e are read at the same time since these data 31c, 13e are connected via timing data 31d whose value is "0"), the voicing data is used in place of the chord name data, as described later. In the present embodiment, the voicing data is used in place of the chord name data only in the case where the readout timing of the chord name data is exactly the same as that of the voicing data. The invention, however, is not limited to this arrangement, but a slight variation or shift in the timing may be permitted provided that the readout timing of the chord name data is substantially the same as that of the voicing data.

In the header data 31 as shown in FIG. 2, "D" is stored as key data 31a, "2" is stored as the recommended capo position data 31b, and "D" is stored as the chord name data 31c. The voicing data 31e is formed of data values representing "the 1st finger (forefinger) on the 3rd fret position of the 1st string", "the 4th finger (little finger) on the 5th fret position of the 2nd string", "the 3rd finger (medical finger) on the 5th fret position of the 3rd string", "the 2nd finger (middle finger) on the 5th fret position of the 4th string", "the 1st finger on the 3rd fret position of the 5th string", and "the 1st finger on the 3rd fret position of the 6th string".

The voicing data represent string-depression positions that are determined in view of the recommended capo data. In the example of FIG. 2, the chord name data 31c is "D", but the voicing data 31e are set to those corresponding to the string-depression positions normally used for the chord name "C" because the recommended capo position data 31b is set to "2". Where the chord name is "C", a low chord consisting of low tones results from the string-depression positions if they are determined according to a general chord table. The voicing data 31e used in the present embodiment, however, are intentionally set to string-depression positions that provide a high chord consisting of high tones. Thus, the voicing data and the recommended capo data perform an integrated function, and therefore no voicing data is established when no recommended capo data is established.

The voicing data is not limited to the above-described data format that gives instructions as to "which finger is used for pressing each string against which fret position on the finger-board", but may be in a data format that gives instructions as to "which string is pressed by each finger against which fret position on the finger-board". While one set of data, i.e., information relating to six strings (or all fingers), is stored as the voicing data in the present embodiment, information relating to each string (or each finger) may be stored separately. Further, the voicing data may include information in the form of string number, for example, with which a non-pressed string (open string) or muted string is designated. In the present embodiment, the voicing data itself provides a part of the chord progression data. The present invention, however, is not limited to this data arrangement, but plural sets of voicing data may be stored, separately from the chord progression data, and designation data (pointer) that designates one set of voicing data may be stored as part of the chord progression data. Furthermore, the voicing data is not limited to the above-described type of data that indicates a combination of the finger, string, and fret position, but may be in the form of image data that indicates the manner in which the fingers are placed on the strings. The image data may be stored as part of the chord progression data. Alternatively, plural sets of image data may be stored, separately from the chord progression data, and designation data (pointer) that designates one of the image data may be stored as part of the chord progression data. Also, these data are not necessarily stored as separate data from the chord name data, but may be stored along with the chord name data, to provide a single block of data.

In the present embodiment, the timing data 32 indicates relative time between adjacent or successive chord name data (or other event data). The timing data 32, however, is not limited to this type, but may be of any type, for example, data representing the readout timing of the chord name data (or other event data) as an absolute point of time with respect to the song or measure as a whole. It is, however, to be noted that the method of handling the timing data needs to be changed depending upon the type of timing data employed, though such a change can be easily made.

Control operations performed by the chord display apparatus constructed as described above will be first described briefly, and then described in detail with reference to FIG. 3 through FIG. 9.

The chord display apparatus of the present embodiment successively reads each data of the chord progression data having the data format as shown in FIG. 2, so as to perform each of the operations as follows:

1) displaying the key set in the chord progression data,
2) displaying the recommended capo position set in the chord progression data,
3) calculating the performance key based on the key displayed in 1) and the recommended capo position displayed in 2), and displaying the obtained performance key,
4) calculating the current chord name (NOW) based on the key displayed in 1), recommended capo position displayed in 2), and a chord name set in the chord progression data, and displaying the obtained chord name, along with its string-depression positions, and
5) calculating the next chord name (NEXT) in the same manner as in 4) above, and displaying the obtained chord name, along with its string-depression positions.

In addition to the above operations, the chord display apparatus of the present embodiment performs alteration of the key set in the chord progression data, alteration of the recommended capo position set in the chord progression data, and alteration of the performance key, in response to a request of a player.

Next, the control operations will be described in detail.

Figure 3:
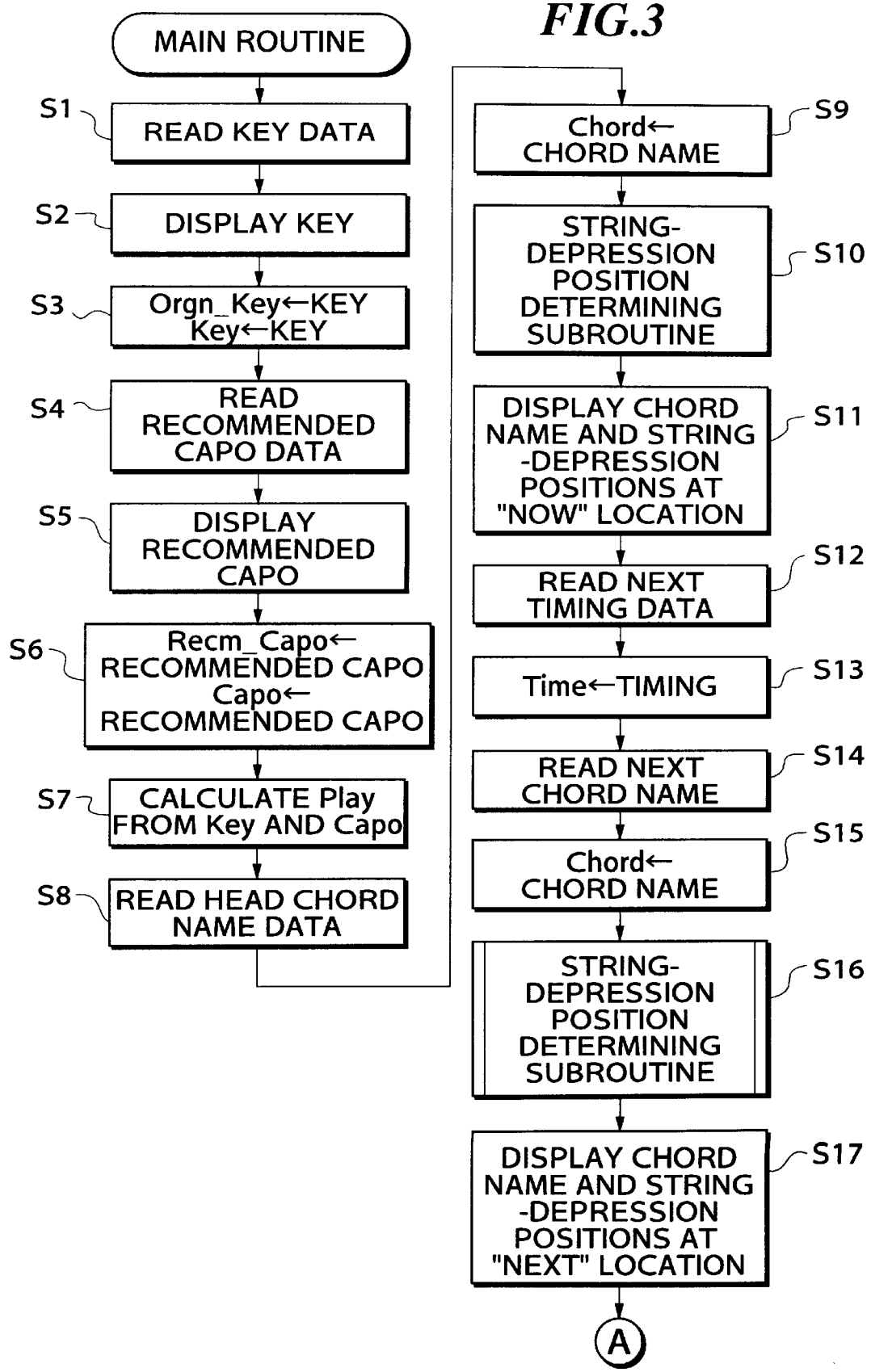
FIG. 3 is a flowchart showing the control flow of a main routine to be executed by the chord display apparatus of FIG. 1, in particular, by its CPU.

FIG. 3 is a flowchart showing the control flow of a main routine that is executed by the CPU 5 of the chord display apparatus of the present embodiment. It is, however, to be understood that each operation of the main routine is performed with respect to the chord progression data of FIG. 2, and, if chord progression data to be processed is different from that of FIG. 2 (including the case where the chord progression data as a whole is identical with that of FIG. 2, but has a different data structure in which the above types of data are arranged in a different order), the arrangement or order of the steps of the main routine need to be changed in accordance with the data structure. Such a change, however, may be easily made without departing from the principle of the present invention.

In FIG. 3, step S1 is first executed to perform initialization so that a pointer that designates the location of each data in the chord progression data points to the header data, and read the key data 31a located at the top position of the header data.

Step S2 is then executed to display the key that corresponds to the key data read in step S1, and step S3 is executed to store the key data in a region Orgn_Key (whose content will be called "original key Orgn_Key") which is reserved at a given position of the RAM 7 for storing the original key, and store the same key data in a region Key (whose content will be called "key Key") which is reserved at a given position of the RAM 7 for storing the key.

Step S4 is executed to advance the pointer by "1", and read data, i.e., recommended capo position data 31b, that is stored at the position designated by the pointer. Step S5 is then executed to display the recommended capo position, in the same manner as in the above step S2, and step S6 is executed to store the recommended capo data read in step S5, in a region Recm-Capo (whose content will be called "recommended capo position Recm_Capo"), and a region Capo (whose content will be called "capo position Capo"), in the same manner as in the above step S3.

While the recommended capo position data 31b is stored as part of the chord progression data in the present embodiment, by way of example, the chord progression data does not necessarily include the recommended capo position data 31b. Where the chord progression data does not include the recommended capo position data 31b, therefore, step S4 is replaced by a step in which the capo position is determined based on the key data read in step S1, instead of reading the recommended capo position 31b. More specifically, 1) the capo position is set to "0" when the key is C or Am,
2) the capo position is set to "1" when the key is C♯ or A♯m,
3) the capo position is set to "2" when the key is D or Bm,
4) the capo position is set to "3" when the key is D♯ or Cm,
5) the capo position is set to "4" when the key is E or C♯m,
6) the capo position is set to "0" when the key is F or Dm,
7) the capo position is set to "1" when the key is F♯ or D♯m,
8) the capo position is set to "0" when the key is G or Em,
9) the capo position is set to "1" when the key is G♯ or Fm,
10) the capo position is set to "2" when the key is A or F♯m,
11) the capo position is set to "3" when the key is A♯ or Gm, and
12) the capo position is set to "4" when the key is B or G♯m.

In step S7, the performance key Play is calculated from the key Key and the capo position Capo, and displayed.

Figure 7:
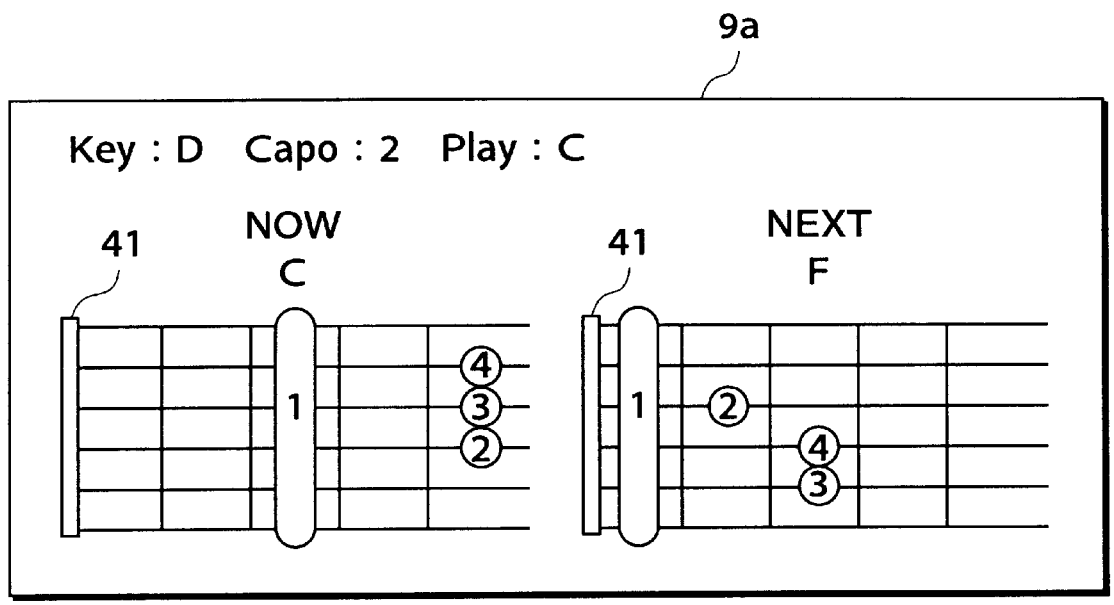
FIG. 7 is a view showing one example of a picture displayed on a screen of a display device of FIG. 1, which picture shows chord information when recommended capotasto data is employed.

FIG. 7 shows one example of a picture that is actually displayed on a display screen 9a of the display device 9, which picture shows chord information when the recommended capo position data 31b is employed. The key, recommended capo position and the performance key that were requested to be displayed in the above steps S2, S5 and S7, respectively, are displayed as "Key: D", "Capo: 2" and "Play: C", as shown in FIG. 7.

Returning to the flowchart of FIG. 3, step S8 is executed to advance the pointer by "1", and read data, i.e., the head chord name data 31c, that is stored at the position designated by the pointer. Step S9 is then executed to store the chord name in a region Chord (whose content will be called "chord name Chord") that is reserved at a given position of the RAM 7 for storing the chord name.

In the following step S10, a subroutine for determining string-depression positions (which will be described in detail referring to FIG. 5) is executed. In this subroutine, the positions at which the fingers are placed on the strings are determined based on the original key Orgn-Key, key Key, and the chord name Chord (or modified chord name). Step S11 is then executed to display the chord name Chord (or modified chord name) and the string-depression positions determined in step S10, at the location "NOW", or current chord display location, as shown in FIG. 7.

Next, step S12 is executed to advance the pointer by "1", and read data, i.e., the timing data 32, that is stored at the position designated by the pointer. Step S13 is then executed to store the timing data 32 in a software timer region Time that is reserved at a given position of the RAM 7. In the software timer region Time, the stored timing data (typically, integer value) is successively decremented for each predetermined time (absolute time or relative time that depends upon the tempo), for measurement of the time. Thus, the software timer region Time functions as a software timer, and will be thus called "software timer Time". The content of the software timer region Time will be called "time Time".

Subsequently, step S14 is executed to advance the pointer by "1", and read data, i.e., the chord name data 33, stored at the position designated by the pointer, and step S15 is then executed to store the chord name data 33 in the above-described region Chord. In step S16, a subroutine for determining string-depression positions is executed in the same manner as in step S10. Step S17 is then executed to display the chord name Chord (or modified chord name) and the string-depression positions determined in step S16, at the "NEXT" location, or next chord display location, as shown in FIG. 7.

In the above manner, the chord name "C" m of the current chord (or modified chord) and its string-depression positions are displayed at the "NOW" location, and the chord name "F" of the next chord (or modified chord) and its string-depression positions are displayed at the "NEXT" location, as shown in FIG. 7 by way of example. Each set of string-depression positions consists of string-depression positions of a high chord, according to the voicing data 31e as described above. Here, a part of the finger-board including five frets as counted from the position of the capo 41 toward the bridge (not illustrated) is displayed, and the string-depression positions are displayed on the finger-board such that each position is represented by a circle (or ellipse) that encircles a corresponding finger number, as shown in FIG. 7. The display of "Capo: 2" indicates that the capo 41 is attached to the second fret position as counted from the nut (not illustrated) toward the bridge. Namely, the part of the finger-board that extends from the capo position 41 toward the neck (not illustrated) is not displayed, so that the display region can be efficiently utilized. Where the capo position Capo is equal to 0, the capo 41 shown in the display represents the nut. The finger number "1" denotes the forefinger, "2" denotes the middle finger, "3" denotes the medical finger, and "4" denotes the little finger. The same notation is employed in FIG. 8 and FIG. 9.

Figure 4:
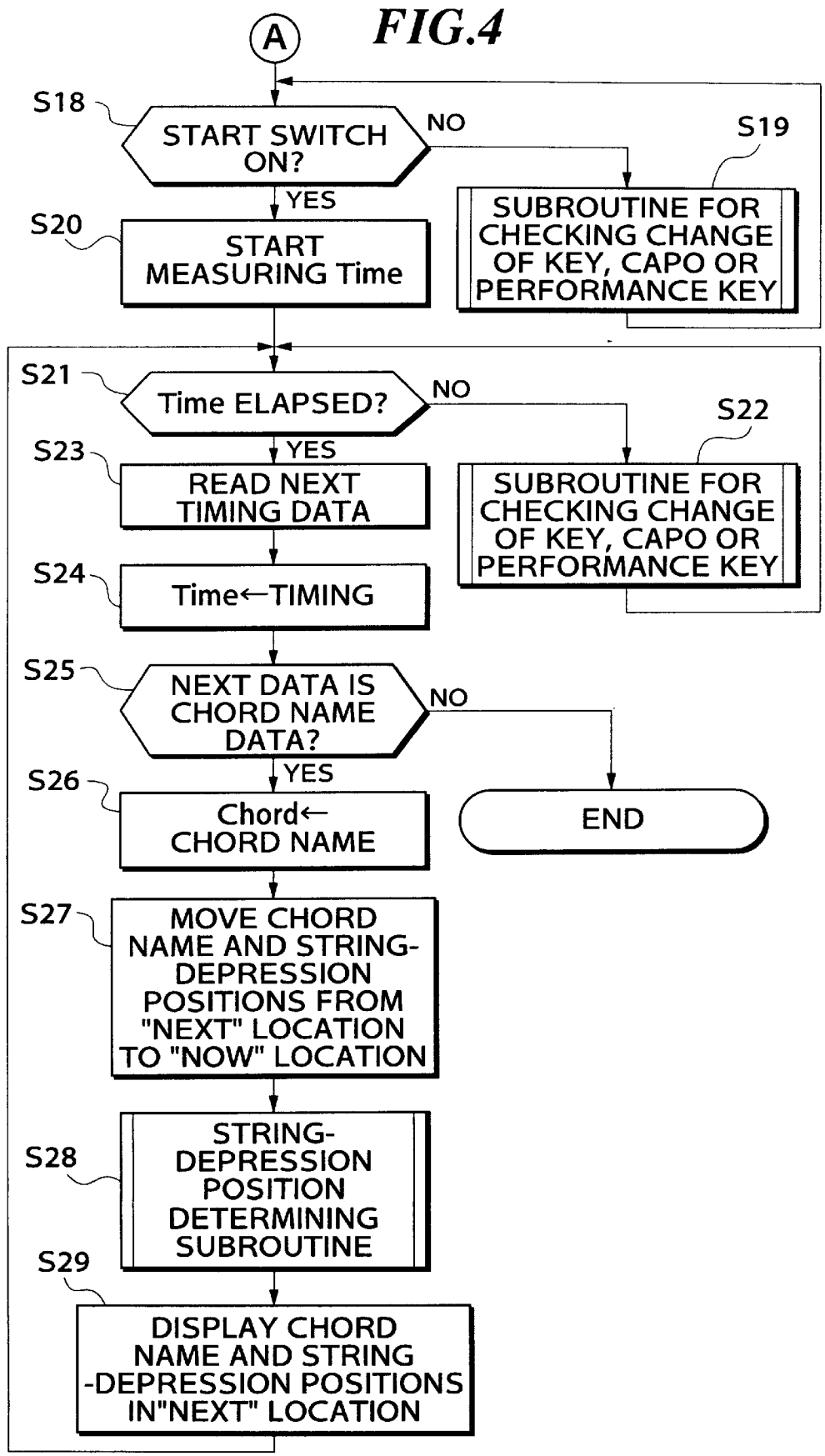
FIG. 4 is a flowchart that follows the flowchart of FIG. 3.

Referring now to FIG. 4, step S18 is executed to determine whether a start switch, not shown, is pressed (turned on) to generate a command to execute a chord display routine according to the chord progression. If the start switch is not pressed, the control flow goes to step S19 to execute a subroutine (which will be described in detail referring to FIG. 6) for checking if the player has directed or ordered any change in the key, capo position, or performance key Play. After executing step S19, the control flow returns to step S18 to wait for depression of the start switch.

If step S18 determines that the start switch has been pressed or turned on, step S20 is then executed to cause the software time Time to start measuring the time. More specifically, a timer interrupt routine, not shown, is implemented to decrement the timing data stored in the software timer region Time by "1" upon each lapse of a predetermined time, as described above.

Subsequently, step S21 is executed to determine whether the time Time has elapsed or not, and, if a negative decision (NO) is obtained in step S21, a subroutine similar to that of step S19 for checking a change in the key, capo position, or the performance key Play is executed in step S22, and the control flow returns to step S21. If step S21 determines that the time Time has elapsed, step S23 is executed to advance the pointer by "1", and read data, i.e., the timing data, that is stored at the position designated by the pointer. Step S24 is then executed to store the timing data in the software timer Time.

Step S25 is then executed to advance the pointer by "1", and read data stored at the position designated by the pointer, to determine whether the data read at this time is chord name data or not. If the data read in step S25 is not chord name data, but end data, the present main routine is terminated. If the data is chord name data, on the other hand, the control flow goes to step S26.

In step S26, the chord name data read in step S25 is set to the chord name Chord. Step S27 is then executed to move the chord name and the string-depression positions displayed at the "NEXT" location, to the "NOW" location.

In the following steps S28 and S29, the string-depression position determining subroutine is executed in the same manner as in steps S16 and S17, and the chord name Chord (or modified chord name) and the determined string-depression positions are displayed in the "NEXT" location. The control flow then returns to step S21 to repeat the above-described processing.

Figure 5:
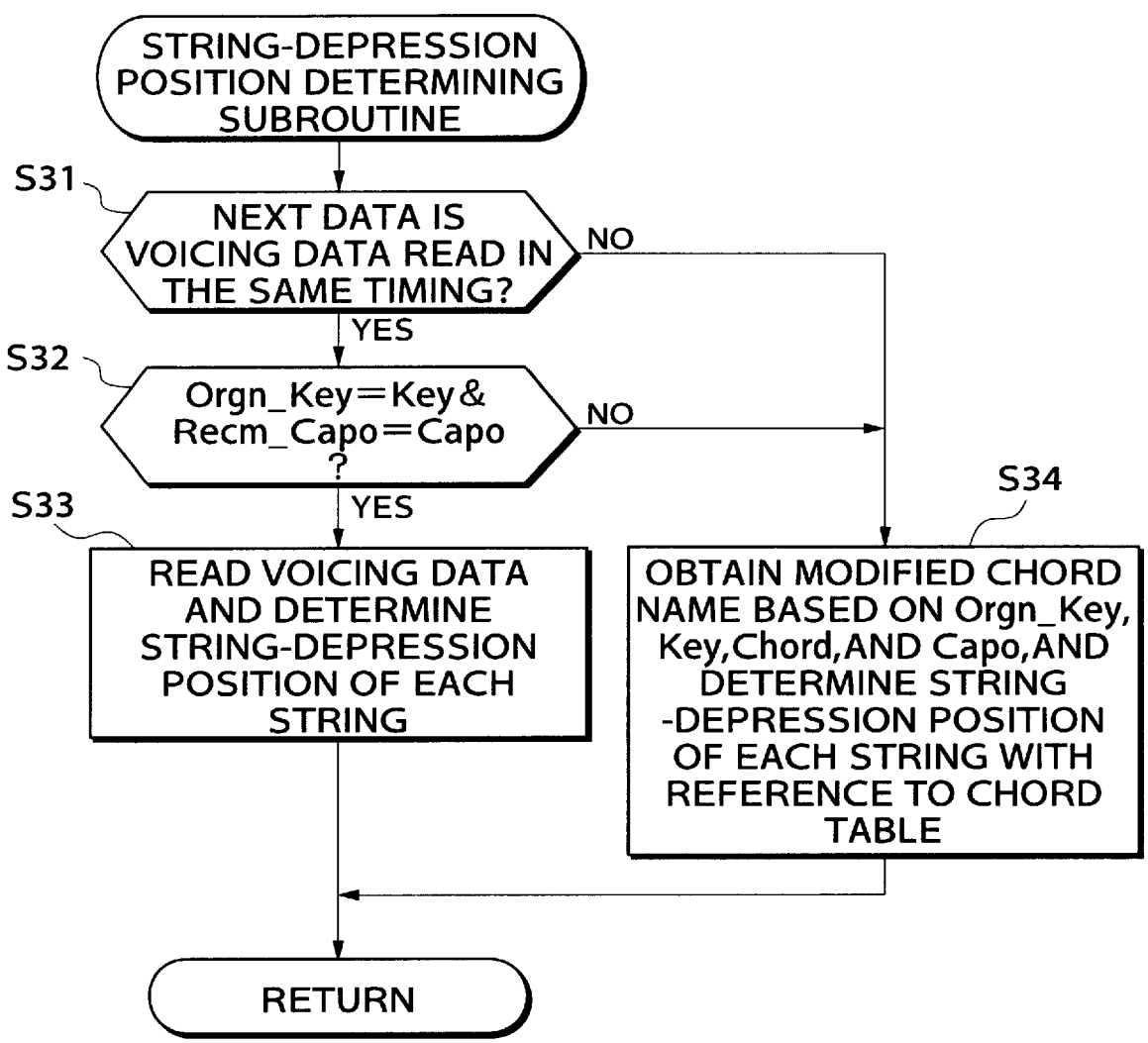
FIG. 5 is a flowchart showing in detail the control flow of a string-depression position determining subroutine of FIG. 3 and FIG. 4.

FIG. 5 is a flowchart showing in detail the control flow of the string-depression position determining subroutine executed in steps S10, S16 and S28.

In FIG. 5, step S31 is initially executed to determine whether timing data whose data value is "0" is located next to the position that is currently designated by the pointer, and whether data located next to the timing data is voicing data.

If the above conditions are satisfied in step S31, step S32 is executed to determine whether the original key Orgn_Key is equal to the key Key, and at the same time the recommended capo position Recm_Capo is equal to the capo position Capo. If these two conditions are satisfied, step S33 is executed to read the voicing data 31e, and determine the string-depression positions of the respective strings. After executing step S33, the present subroutine for determining the string-depression positions is terminated.

Thus, the voicing data is used in place of the chord name data when the readout timing of the voicing data is the same as that of the chord name data, as stated above. In addition to this condition, the voicing data is used when the condition of step S32 that at least one of the key Key and the capo position Capo is not changed by the player is satisfied. Thus, in the present embodiment, the voicing data is used upon the assumption that both of the above conditions are satisfied.

If the condition of step S31 is not satisfied, or if the condition of step S32 is not satisfied, on the other hand, a modified chord name (fundamental note or root) is calculated based on the original key Orgn_Key, key Key, chord name Chord, and the capo position Capo, according to the following steps (1) to (3). It is, however, to be noted that the type of the chord name is not modified.

(1) The difference between the keynotes (tonics) of Orgn_Key and Key is obtained.
(2) The difference of the keynotes obtained in the step (1) is added to the root of Chord.
(3) The value of Capo is subtracted from the root of Chord.

As a specific example, were Orgn_Key=D, Key=F♯, Chord=G, and Capo=2, the modified chord name turns out to be A.

Step S34 is then executed to determine the string-depression positions of the respective strings that correspond to the modified chord name, referring to the chord table, and the present subroutine for determining the string-depression positions is then terminated.

Figure 6:
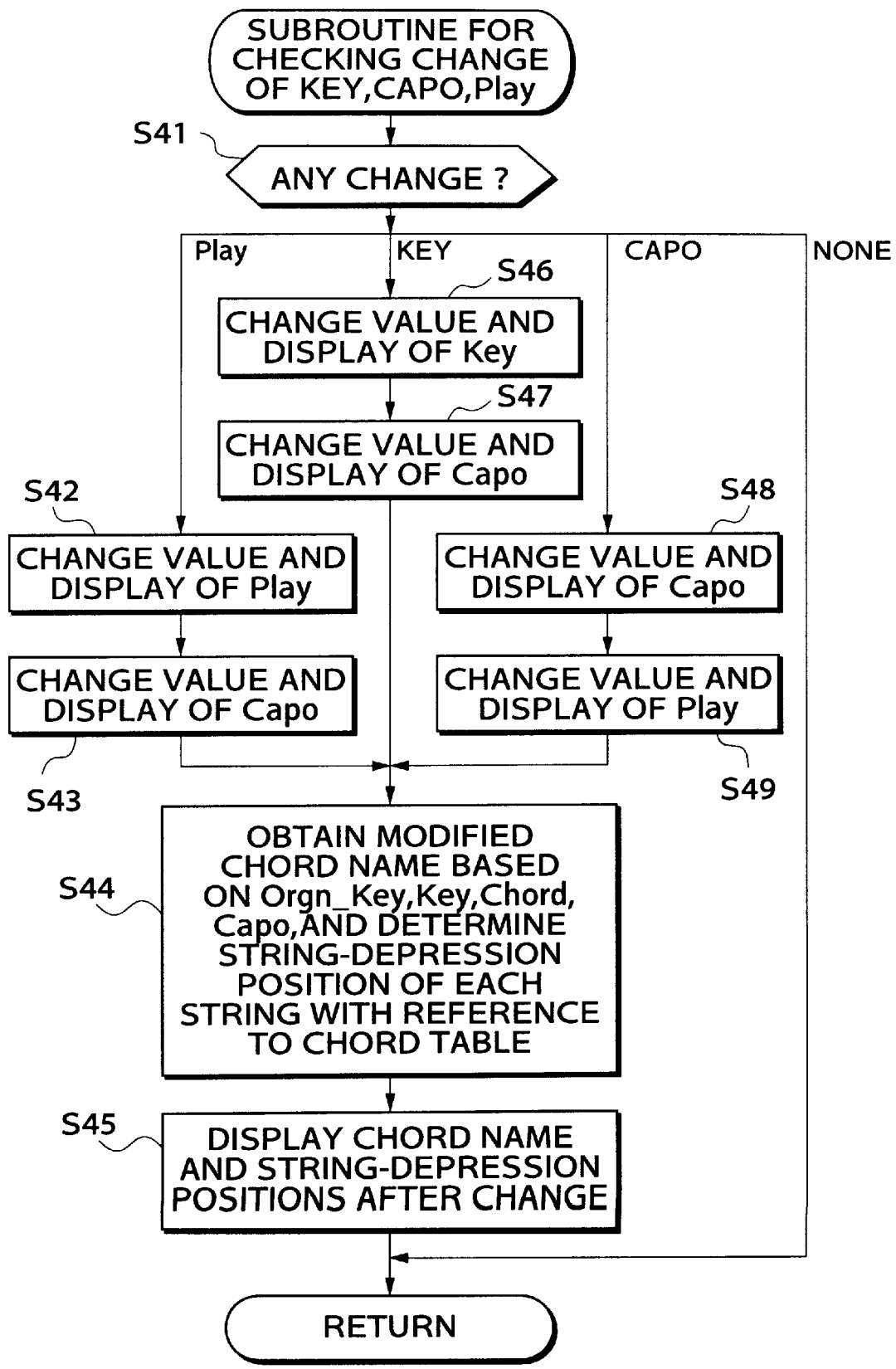
FIG. 6 is a flowchart showing in detail the control flow of a subroutine of FIG. 4 for checking changes in the key, capotasto, and performance play Play.

FIG. 6 is a flowchart showing the control flow of the subroutine of steps S19 and S22 for checking a change in the key, capo position, or the performance key Play.

In FIG. 6, step S41 is initially executed to determine whether the player has directed or ordered any change in the key, capo position or the performance play Play. To generate a command to change the key, capo position or performance play Play, the player is required to press an appropriate one of a key change switch, a capo position change switch, and a performance key (Play) change switch, none of which is shown. The method for generating the command is not limited to this, but may be selected from any other method provided that a desired change in the key, capo position or performance key Play can be directed.

If step S41 determines that the player has not directed any change, the subroutine for checking a change in the key, capo position or performance key Play is immediately terminated. If the player has generated a command to change any one of the key, capo position and the performance key Play, an appropriate branch is selected depending upon the command. Namely, the control flow goes to step S42 if a change in the "performance key Play" has been directed, and goes to step S46 if a change in the "key Key" has been directed, while the control flow goes to step S48 if a change in the "capo position Capo" has been directed. In the present embodiment, the performance key Play may be changed within the range of F to E, and the key Key may be changed from the original key Orgn_Key within the range of ±5, while the capo position Capo may be changed within the range of 0 to 11.

In step S42, the performance key Play is changed to the directed value, i.e., the value set by the player, and the display of the performance key Play is also changed. In step S43, the capo position Capo is changed in accordance with the change of the performance key Play, and the display of the capo position Capo is also changed. If a command to increase the value of the performance key Play by "1" is generated, the capo position Capo is reduced by "1".

In step S44, a modified chord name is obtained based on the original key Orgn_key, key Key, chord name Chord and the capo position Capo, in the same manner as in the above-indicated step S34, and the string-depression positions of the respective strings are determined referring to the chord table, so that the string-depression positions correspond to the modified chord name. After step S45 is executed to display the chord name and string-depression positions that have been changed, the present subroutine for changing the key, capo position or the performance key Play is terminated. The operations of steps S44 and S45 are performed on both of the current chord (which is displayed at the "NOW" location), and the next chord (which is displayed at the "NEXT" location).

In step S46, the key Key is changed to the value directed by the player, and the display of the key Key is also changed. In step S47, the capo position Capo is changed in accordance with the change of the key Key, and the display of the capo position is changed. Step S47 is then followed by step S44. If a command to increase the value of the key Key by "1" is generated, for example, the capo position Capo is increased by "1".

Figure 8:
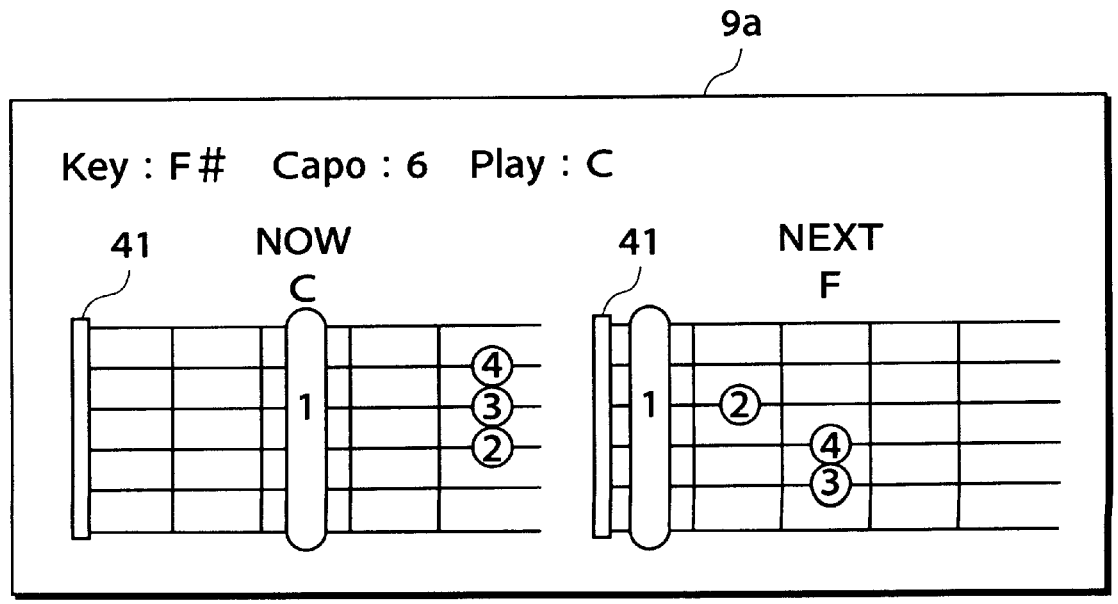
FIG. 8 is a view showing one example of a picture displayed on a screen of the display device, which picture shows chord information when the key is changed.

FIG. 8 illustrates one example of a picture actually displayed on the display screen 9a of the display device 1 of FIG. 1, which picture shows chord information when the key has been changed. If the key Key is changed from the original key "D" to "F#", only the capo position Capo is changed from the original position "2" to "6", while the performance key Play, and the current chord and the next chord remain the same, as shown in FIG. 8. In other words, the capo position Capo is changed so that, even if the key is changed, the chord names of the current chord and next chord and the manners of pressing the strings to produce these chords remain the same as those before the change of the key.

In step S48, the capo position Capo is changed to the value directed by the player, and the display of the capo position is also changed. In step S47, the performance key Play is changed in accordance with the change of the capo position Capo, and the display of the performance key Play is changed. Step S47 is then followed by step S44. If a command to increase the capo position Capo by "1" is generated, for example, the performance key Play is reduced by "1".

Figure 9:
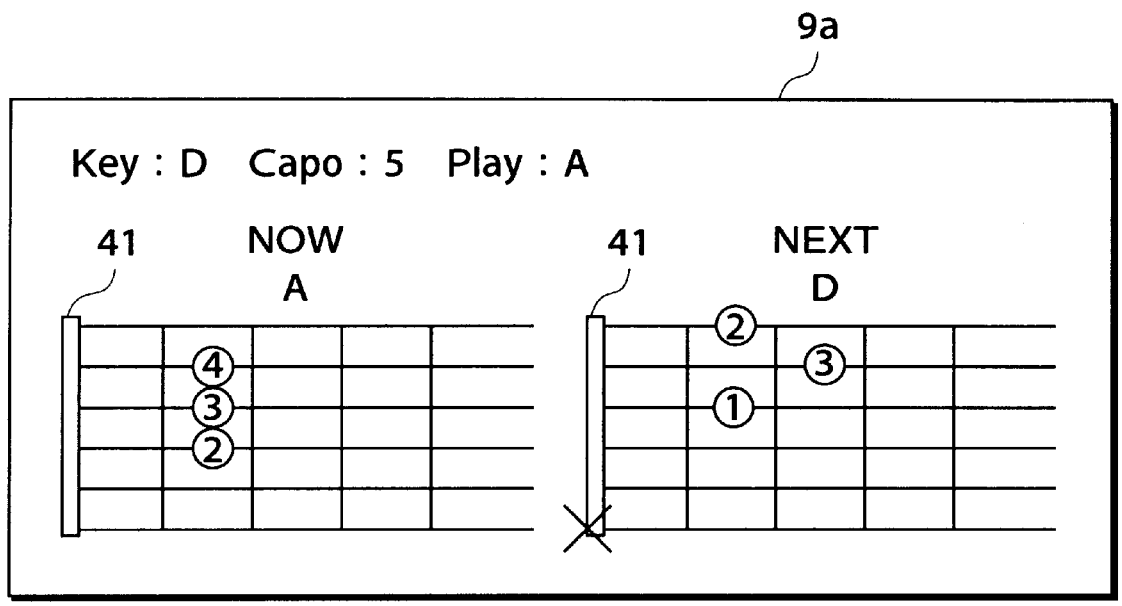
FIG. 9 is a view showing one example of a picture displayed on a screen of the display device, which picture shows chord information when the capotasto position is changed.

FIG. 9 illustrates one example of a picture actually displayed on the display screen 9a of the display device 1 of FIG. 1, which picture shows chord information when the capo position has been changed. If the capo position Capo is changed from the original capo position "2" to a new position "5", as shown in FIG. 9, the performance key Play is changed from the original key "C" to key "A", and the current chord is changed from the original chord name "C" to a modified chord name "A", while the next chord is changed from the original chord name "F" to a modified chord name "D". In addition, the string-depression positions are changed to the positions corresponding to the modified chord names, in accordance with the changes of the chords. In the display of the string-depression positions for the next chord as shown in FIG. 9, symbol "X" indicates that the relevant string (sixth string) should be muted.

In the present embodiment, as described above, data (voicing data 31e) indicative of the manner of pressing the strings are stored as needed, and therefore the player is able to play the music in various fashions even if he/she does not know many ways of pressing the strings (frets) for each chord name. If the basic or standard manner of pressing the strings can be employed, the string-depression positions are displayed referring to the chord table, which leads to a reduction in the required storage capacity as compared with the case where data indicative of the manner of pressing the strings are stored with respect to all chords.

As another advantage of the present invention, the original chord is changed into another chord consisting of notes with the possibly fewest number of sharps and flats, based on the recommended capo position data 31b where it is stored, or based on the determined capo position where the recommended capo position data 31b is not stored, and the resulting chord is displayed. Thus, the present apparatus is able to present such chords that can be easily played by the player even if he/she is a beginner.

Since the capo position Capo is automatically changed if the key of the song (performance key Play or the key Key) is changed, the player is able to play the song by pressing the strings in the same manner as that before the change of the key.

While only the chord name(s) and the string-depression positions are displayed in the present embodiment, tones corresponding to the string-depression positions, performance (accompaniment) tones made by other instrument(s), melody, song, and others may be also generated along with the display of the chord names and string-depression positions. Also, the present invention may be applied to a karaoke (sing-along) machine, wherein accompanying tones may be generated along with a display of words, and at the same time corresponding chords may be displayed. When the user wishes to change the key of a song played by the karaoke machine, the pitch of tones to be generated may be changed.

While the current chord and the next chord are displayed in the present embodiment, the chord display format is not limited to this, but a chord following the next chord, or a past chord, may be displayed, or only the current chord may be displayed. In the present embodiment, the display of the current chord is fixed to the left-hand side portion, and the display of the next chord is fixed to the right-hand side portion. The present invention, however, is not limited to this chord display format in which the current chord and next chord are displayed in fixed display regions. Rather, the display region of the current chord and that of the next chord may be switched or changed alternately, or three or more chords may be displayed at the same time, such that an index that indicates the position of the current chord is sequentially moved in accordance with the progression of the performance (like wipe of words in karaoke machines).

While the present invention is applied to the sixstringed guitar in the illustrated embodiment, the invention may also be applied to other instruments, such as a bass guitar or an ukulele, that have different numbers of strings.

It is also possible to provide displays or indicators at fret positions on the finger-board of an actual guitar, and display on the displays or indicators the manner of pressing the strings on the finger-board (fret bar) of the guitar.

In the illustrated embodiment, the key, capo position and the performance key can be changed as desired according to an instruction or command of the player. However, all of these three elements need not be changed, but only one or two of these elements may be changed. For example, only the capo position and the performance key can be changed, while the key cannot be changed. In this case, the modified chord name may be obtained only based on Orgn_Key, Chord, and Capo.

It is to be understood that the object of the present invention may also be attained by supplying a system or an apparatus with a storage medium in which a software program that realizes the functions of the present invention as described with respect to the illustrated embodiment is recorded, and causing a computer (CPU 5 or MPU) of the system or apparatus to read out and execute the program stored in the storage medium.

In this case, the program itself read from the storage medium accomplishes the novel functions of the present invention, and thus the storage medium storing the program constitutes the present invention.

The storage medium for supplying the above-described program to the system or apparatus may be selected from the floppy disc 20 as indicated above, hard disc, optical disc, magneto-optic disc, CD-ROM 21, CD-R, magnetic tape, non-volatile memory card, and ROM 6, for example. A program code may be supplied from other MIDI equipment 100, or the server computer 102 via the communication network 101.

The functions of the present invention may be accomplished by executing a program code read by a computer, or causing an operating system (OS) that operates on the computer, to perform a part or the whole of the actual operation according to instructions of the program code.

When a musical instrument with which the apparatus of the present invention is used takes the form of an electronic musical instrument, the musical instrument is not limited to a stringed instrument, like that of the illustrated embodiment, but may be in the form of a keyboard instrument, wind instrument, percussion instrument, or others.

Furthermore, the program code read from the storage medium may be written into a memory provided in an expanded board inserted in the computer, or an expanded unit connected to the computer, and a CPU, or the like, provided in the expanded board or expanded unit may actually perform part or all of the operations according to instructions of the program code, so as to accomplish the functions of the present invention.

What is claimed is:

1. A chord display apparatus for use with a musical instrument including a plurality of playing elements, comprising:

a storage device that stores sequence data comprising a plurality of data including at least chord data that are arranged in accordance with a predetermined chord progression;

a reading device that sequentially reads each data of said sequence data stored in said storage device;

a determining device that determines a first operating manner when each of the chord data is read by the reading device, the first operating manner being a standard manner of operating the playing elements of the musical instrument so as to produce a chord represented by the chord data; and a display device that displays the first operating manner determined by said determining device;

wherein said storage device stores operating manner data that indicates a second operating manner different from said first operating manner, such that the operating manner data is associated with the chord data;

wherein said determining device determines the second operating manner indicated by the operating manner data, as an operating manner for producing the chord represented by the chord data, when the operating manner data is read in association with the chord data read by the reading device; and wherein said display device displays the second operating manner determined by said determining device.

2. A chord display apparatus for use with a musical instrument including a plurality of strings and a capotasto, comprising:

a storage device that stores sequence data comprising a plurality of data including at least chord data that are arranged in accordance with a predetermined chord progression;

a reading device that sequentially reads each data of the sequence data stored in said storage device;

a determining device that determines a first string-depression manner of pressing the strings when each of the chord data is read by said reading device, said first string-depression manner being a standard manner of pressing the strings of the musical instrument so as to produce a chord represented by the chord data; and a display device that displays said first string-depression manner determined by said determining device;

wherein said storage device stores string-depression manner data that indicates a second string-depression manner different from said first string-depression manner, such that the string-depression manner data is associated with the chord data;

wherein said determining device determines the second string-depression manner indicated by the string-depression manner data, as a string-depression manner for producing the chord represented by the chord data, when the string-depression manner data is read in association with the chord data read by the reading device; and wherein said display device displays the second string-depression manner determined by said determining device.

3. A chord display apparatus for use with a musical instrument including a plurality of playing elements, comprising:

a storage device that stores sequence data comprising a plurality of data including at least chord data that are arranged in accordance with a predetermined chord progression;

a reading device that sequentially reads each data of the sequence data stored in said storage device;

a determining device that determines a first operating manner when each of the chord data is read by said reading device, said first operating manner being a standard manner of operating the playing elements of the musical instrument so as to produce a chord represented by the chord data; and a display device that displays the first operating manner determined by said determining device;

wherein said storage device stores recommended capotasto position data that indicates a recommended capotasto position on the musical instrument;

wherein said determining device changes said first operating manner as an operating manner for producing the chord represented by the chord data read by said reading device, to a second operating manner that is determined based on said recommended capotasto position, so as to provide a chord that can be easily played by a player; and wherein said display device displays the second operating manner obtained by said determining device.

4. A chord display apparatus for use with a musical instrument including a plurality of strings and a capotasto, comprising:

a storage device that stores sequence data comprising a plurality of data including at least chord data that are arranged in accordance with a predetermined chord progression;

a reading device that sequentially reads each data of the sequence data stored in said storage device;

a determining device that determines a first string-depression manner of pressing the strings when each of the chord data is read by said reading device, said first string-depression manner being a standard manner of pressing the strings of the musical instrument so as to produce a chord represented by the chord data; and a display device that displays said first string-depression manner determined by said determining device;

wherein said storage device stores recommended capotasto position data that indicates a recommended capotasto position on the musical instrument;

wherein said determining device changes said first string-depression manner as the standard manner of pressing the strings so as to produce the chord represented by the chord data read by said reading device, to a second string-depression manner that is determined based on said recommended capotasto position, so as to provide a chord that can be easily played by a player; and wherein said display device displays the second string-depression manner obtained by said determining device.

5. A chord display apparatus for use with a musical instrument including a plurality of playing elements, comprising:
- a storage device that stores sequence data comprising a plurality of data including at least key data indicative of a key, and chord data that are arranged in accordance with a predetermined chord progression;
- a reading device that sequentially reads each data of the sequence data stored in said storage device;
- a determining device that determines a first operating manner when each of the chord data is read by said reading device, said first operating manner being a standard manner of operating the playing elements of the musical instrument so as to produce a chord represented by the chord data; and
- a display device that displays the first operating manner determined by said determining device; and
- a calculating device that calculates a recommended position of the capotasto of the musical instrument when said key data is read, so that chords formed based on the recommended capotasto position can be easily played by a player, in accordance with a key represented by the key data;
- wherein said determining device changes said first operating manner as an operating manner for producing the chord represented by the chord data read by said reading device, to a second operating manner that is determined based on the recommended capotasto position, so that the player is able to easily play each chord in the second operating manner; and
- wherein said display device displays the second operating manner obtained by said determining device.

6. A chord display apparatus for use with a musical instrument including a plurality of strings and a capotasto, comprising:
- a storage device that stores sequence data comprising a plurality of data including at least key data indicative of a key, and chord data that are arranged in accordance with a predetermined chord progression;
- a reading device that sequentially reads each data of the sequence data stored in said storage device;
- a determining device that determines a first string-depression manner of pressing the strings when each of the chord data is read by said reading device, said first string-depression manner being a standard manner of pressing the strings of the musical instrument so as to produce a chord represented by the chord data;
- a display device that displays said first string-depression manner determined by said determining device; and
- a calculating device that calculates a recommended position of the capotasto of the musical instrument when said key data is read, so that chords formed based on the recommended capotasto position can be easily played by a player, in accordance with a key represented by the key data;
- wherein said determining device changes said first string-depression manner as the standard manner of pressing the strings, to a second string-depression manner that is determined based on the recommended capotasto position, so that the player is able to easily play each chord in the second string-depression manner; and
- wherein said display device displays the second string-depression manner obtained by said determining device.

7. A chord display apparatus for use with a musical instrument including a plurality of strings and a capotasto, comprising:
- a storage device that stores sequence data comprising a plurality of data including at least key data indicative of a key, and chord data that are arranged in accordance with a predetermined chord progression;
- a reading device that sequentially reads each data of the sequence data stored in said storage device;
- a display device that displays a chord based on the chord data read by said reading device;
- a capotasto position supplying device that supplies a capotasto position of the musical instrument, which changes the chord data read by said reading device, into a chord that can be easily played by a player;
- a key changing device that changes the key data read by said reading device, into another key that is directed by the player;
- a performance key determining device that determines a performance key based on the key data read by said reading device, and the capotasto position supplied by said capotasto position supplying device;
- a capotasto position changing device that changes the supplied capotasto position, to another capotasto position that matches the key data changed by said key changing device and the performance key determined by said performance key determining device, when the key data is changed by said key changing device; and
- a modifying device that modifies the chord data read by said reading device, based on the key data read by the reading device, the key data changed by said key changing device, and the capotasto position changed by said capotasto position changing device;
- wherein said display device displays a chord based on the chord data modified by said modifying device.

8. A chord display apparatus for use with a musical instrument including a plurality of strings and a capotasto, comprising:
- a storage device that stores sequence data comprising a plurality of data including at least key data indicative of a key, and chord data that are arranged in accordance with a predetermined chord progression;
- a reading device that sequentially reads each data of the sequence data stored in said storage device;
- a display device that displays a chord based on each of the chord data read by said reading device;
- a capotasto position supplying device that supplies a capotasto position of the musical instrument, which changes the chord data read by said reading device, into another chord that can be easily played by a player;
- a performance key determining device that determines a performance key based on the key data read by said reading device, and the capotasto position supplied by said capotasto position supplying device;
- a capotasto position changing device that changes the capotasto position supplied by said capotasto position supplying device, to a capotasto position that is directed by the player;
- a performance key changing device that changes the performance key determined by said performance key determining device, to a performance key that matches the capotasto position changed by said capotasto position changing device and the key data read by said reading device, when the capotasto position is changed by said capotasto position changing device; and a modifying device that modifies the chord data read by said reading device, based on the key data read by said reading device, and the capotasto position changed by said capotasto position changing device;

wherein said display device displays a chord based on the chord data modified by said modifying device.

9. A chord display apparatus for use with a musical instrument including a plurality of strings and a capotasto, comprising:

a storage device that stores sequence data comprising a plurality of data including at least key data indicative of a key, and chord data that are arranged in accordance with a predetermined chord progression;

a reading device that sequentially reads each data of the sequence data stored in said storage device;

a display device that displays a chord based on each of the chord data read by said reading device;

a capotasto position supplying device that supplies a capotasto position of the musical instrument, which changes the chord data read by said reading device, into a chord that can be easily played by a player;

a performance key determining device that determines a performance key based on the key data read by said reading device, and the capotasto position supplied by said capotasto position supplying device;

a performance key changing device that changes the performance key determined by said performance key determining device, to a performance key that is directed by the player;

a capotasto position changing device that changes the capotasto position supplied by said capotasto position supplying device, to a capotasto position that matches the performance key changed by said performance key changing device and the key data read by said reading device, when the performance key is changed by said performance key changing device; and a modifying device that modifies the chord data read by said reading device, based on the key data read by said reading device, and the capotasto position changed by said capotasto position changing device;

wherein said display device displays a chord based on the chord data modified by said modifying device.

10. A storage medium storing a program that is executable by a computer to implement a chord display method for a musical instrument including a plurality of playing elements, said program comprising:

a reading module that sequentially reads each data of sequence data stored in a storage device, said sequence data comprising a plurality of data including at least chord data that are arranged in accordance with a predetermined chord progression;

a determining module that determines a first operating manner when each of the chord data is read by said reading module, said first operating manner being a standard manner of operating the playing elements of the electronic instrument so as to produce a chord represented by the chord data; and a display module that displays the first operating manner determined by said determining module;

wherein said storage device stores operating manner data that indicates a second operating manner different from said first operating manner, such that the operating manner data is associated with the chord data;

wherein said determining module determines the second operating manner indicated by the operating manner data, as an operating manner for producing the chord represented by the chord data, when the operating manner data is read in association with the chord data read by the reading module; and wherein said display module displays the second operating manner determined by said determining module.

11. A storage medium storing a program that is executable by a computer to implement a chord display method for an electronic instrument including a plurality of strings and a capotasto, said program comprising:

a reading module that sequentially reads each data of sequence data stored in a storage device, said sequence data comprising a plurality of data including at least chord data that are arranged in accordance with a predetermined chord progression;

a determining module that determines a first string-depression manner of pressing the strings when each of the chord data is read by said reading module, said first string-depression manner being a standard manner of pressing the strings of the musical instrument so as to produce a chord represented by the chord data; and a display module that displays said first string-depression manner determined by said determining module;

wherein said storage device stores string-depression manner data that indicates a second string-depression manner different from said first string-depression manner, such that the string-depression manner data is associated with the chord data;

wherein said determining module determines the second string-depression manner indicated by the string-depression manner data, as a string-depression manner for producing the chord represented by the chord data, when the string-depression manner data is read in association with the chord data read by the reading module; and wherein said display module displays the second string-depression manner determined by said determining module.

12. A storage medium storing a program that is executable by a computer to implement a chord display method for a musical instrument including a plurality of playing elements, said program comprising:

a reading module that sequentially reads each data of sequence data stored in a storage device, said sequence data comprising a plurality of data including at least chord data that are arranged in accordance with a predetermined chord progression;

a determining module that determines a first operating manner when each of the chord data is read by said reading module, said first operating manner being a standard manner of operating the playing elements of the musical instrument so as to produce a chord represented by the chord data; and a display module that displays the first operating manner determined by said determining module;

wherein said storage device stores recommended capotasto position data that indicates a recommended capotasto position on the musical instrument;

wherein said determining module changes said first operating manner as an operating manner for producing the chord represented by the chord data read by said reading module, to a second operating manner that is determined based on said recommended capotasto position, so as to provide a chord that can be easily played by a player; and wherein said display module displays the second operating manner obtained by said determining module.

13. A storage medium storing a program that is executable by a computer to implement a chord display method for an electronic instrument including a plurality of strings and a capotasto, said program comprising:

a reading module that sequentially reads each data of sequence data stored in a storage device, said sequence data comprising a plurality of data including at least chord data that are arranged in accordance with a predetermined chord progression;

a determining module that determines a first string-depression manner of pressing the strings when each of the chord data is read by said reading module, said first string-depression manner being a standard manner of pressing the strings of the musical instrument so as to produce a chord represented by the chord data; and a display module that displays said first string-depression manner determined by said determining module;

wherein said storage device stores recommended capotasto position data that indicates a recommended capotasto position on the musical instrument;

wherein said determining module changes said first string-depression manner as the standard manner of pressing the strings so as to produce the chord represented by the chord data read by said reading module, to a second string-depression manner that is determined based on said recommended capotasto position, so as to provide a chord that can be easily played by a player; and wherein said display module displays the second string-depression manner obtained by said determining module.

14. A storage medium storing a program that is executable by a computer to implement a chord display method for a musical instrument including a plurality of playing elements, said program comprising:

a reading module that sequentially reads each data of sequence data stored in a storage device, said sequence data comprising a plurality of data including at least key data indicative of a key, and chord data that are arranged in accordance with a predetermined chord progression;

a determining module that determines a first operating manner when each of the chord data is read by said reading module, said first operating manner being a standard manner of operating the playing elements of the musical instrument so as to produce a chord represented by the chord data; and a display module that displays the first operating manner determined by said determining module; and a calculating module that calculates a recommended position of the capotasto of the musical instrument when said key data is read, so that chords formed based on the recommended capotasto position can be easily played by a player, in accordance with a key represented by the key data;

wherein said determining module changes said first operating manner as an operating manner for producing the chord represented by the chord data read by said reading module, to a second operating manner that is determined based on the recommended capotasto position, so that the player is able to easily play each chord in the second operating manner; and wherein said display module displays the second operating manner obtained by said determining device.

15. A storage medium storing a program that is executable by a computer to implement a chord display method for a musical instrument including a plurality of strings and a capotasto, said program comprising:

a reading module that sequentially reads each data of sequence data stored in a storage device, said sequence data comprising a plurality of data including at least key data indicative of a key, and chord data that are arranged in accordance with a predetermined chord progression;

a determining module that determines a first string-depression manner of pressing the strings when each of the chord data is read by said reading module, said first string-depression manner being a standard manner of pressing the strings of the musical instrument so as to produce a chord represented by the chord data;

a display module that displays said first string-depression manner determined by said determining module; and a calculating module that calculates a recommended position of the capotasto of the musical instrument when said key data is read, so that chords formed based on the recommended capotasto position can be easily played by a player, in accordance with a key represented by the key data;

wherein said determining module changes said first string-depression manner as the standard manner of pressing the strings, to a second string-depression manner that is determined based on the recommended capotasto position, so that the player is able to easily play each chord in the second string-depression manner; and wherein said display module displays the second string-depression manner obtained by said determining module.

16. A chord display method for a musical instrument including a plurality of playing elements, said method comprising:

a reading step of sequentially reading each data of sequence data stored in a storage device, said sequence data comprising a plurality of data including at least chord data that are arranged in accordance with a predetermined chord progression;

a determining step of determines a first operating manner when each of the chord data is read by said reading step, said first operating manner being a standard manner of operating the playing elements of the musical instrument so as to produce a chord represented by the chord data; and a display step of displaying the first operating manner determined by said determining step;

wherein said storage device stores operating manner data that indicates a second operating manner different from said first operating manner, such that the operating manner data is associated with the chord data;

wherein said determining step determines the second operating manner indicated by the operating manner data, as an operating manner for producing the chord represented by the chord data, when the operating manner data is read in association with the chord data read by the reading step; and wherein said display step displays the second operating manner determined by said determining step.

17. A chord display method for an electronic instrument including a plurality of strings and a capotasto, said method comprising:

a reading step of sequentially reading each data of sequence data stored in a storage device, said sequence data comprising a plurality of data including at least chord data that are arranged in accordance with a predetermined chord progression;

a determining step of determining a first string-depression manner of pressing the strings when each of the chord data is read by said reading step, said first string-depression manner being a standard manner of pressing the strings of the musical instrument so as to produce a chord represented by the chord data; and a display step of displaying said first string-depression manner determined by said determining step;

wherein said storage device stores string-depression manner data that indicates a second string-depression manner different from said first string-depression manner, such that the string-depression manner data is associated with the chord data;

wherein said determining step determines the second string-depression manner indicates by the string-depression manner data, as a string-depression manner for producing the chord represented by the chord data, when the string-depression manner data is read in association with the chord data read by the reading step; and wherein said display step displays the second string-depression manner determines by said determining step.

18. A chord display method for a musical instrument including a plurality of playing elements, said method comprising:

a reading step of sequentially reading each data of sequence data stored in a storage device, said sequence data comprising a plurality of data including at least chord data that are arranged in accordance with a predetermined chord progression;

a determining step of determining a first operating manner when each of the chord data is read by said reading step, said first operating manner being a standard manner of operating the playing elements of the musical instrument so as to produce a chord represented by the chord data; and a display step of displaying the first operating manner determined by said determining step;

wherein said storage device stores recommended capotasto postion data that indicates a recommended capotasto position on the musical instrument;

wherein said determining step changes said first operating manner as an operating manner for producing the chord represented by the chord data read by said reading step, to a second operating manner that is determined based on said recommended capotasto position, so as to provide a chord that can be easily played by a player; and wherein said display step displays the second operating manner obtained by said determining step.

19. A chord display method for an electronic instrument including a plurality of strings and a capotasto, said method comprising:

a reading step of sequentially reading each data of sequence data stored in a storage device, said sequence data comprising a plurality of data including at least chord data that are arranged in accordance with a predetermined chord progression;

a determining step of determining a first string-depression manner of pressing the strings when each of the chord data is read by said reading step, said first string-depression manner being a standard manner of pressing the strings of the musical instrument so as to produce a chord represented by the chord data; and a display step of displays said first string-depression manner determined by said determining step;

wherein said storage device stores recommended capotasto position data that indicates a recommended capotasto position on the musical instument;

wherein said determining step changes said first string-depression manner as the standard manner of pressing the strings so as to produce the chord represented by the chord data read by said reading step, to a second string-depression manner that is determined based on said recommended capotasto position, so as to provide a chord that can be easily played by a player; and wherein said display step displays the second sting-depression manner obtained by said determining step.

20. A chord display method for a musical instument including a plurality of playing elements, said method comprising:

a reading step of sequentially reading each data of sequence data stored in a storage device, said sequence data comprising a plurality of data including at least key data indicative of a key, and chord data that are arranged in accordance with a predetermined chord progression;

a determining step of determining a first operating manner when each of the chord data is read by said reading step, said first operating manner being a standard manner of operating the playing elements of the musical instument so as to produce a chord represented by the chord data; and a display step of displaying the first operating manner determined by said determining step; and a calculating step of calculating a recommended position of the capotasto of the musical instument when said key data is read, so that chords formed based on the recommended capotasto position can be easily played by a player, in accordance with a key represented by the key data;

wherein said determining the step changes said first operating manner as an operating manner for producing the chord represented by the chord data read by said reading step, to a second operating manner that is determined based on the recommended capotasto position, so that the player is able to easily play each chord in the second operating manner; and wherein said display step displays the second operating manner obtained by said determining device.

21. A chord display method for a musical instrument including a plurality of strings and a capotasto, said method comprising:

a reading step of sequentially reading each data of sequence data stored in a storage device, said sequence data comprising a plurality of data including at least key data indicative of a key, and chord data that are arranged in accordance with a predetermined chord progression;

a determining step of determining a first string-depressing manner of pressing the strings when each of the chord data is read by said reading step, said first string-depression manner being a standard manner of pressing the strings of the musical instrument so as to produce a chord represented by the chord data;

a display step of displaying said first string-depression manner determined by said determining step; and a calculating step of calculating a recommended position of the capotasto of the musical instrument when said key data is read, so that chords formed based on the recommended capotasto position can be easily played by a player, in accordance with a key represented by the key data;

wherein said determining step changes said first string-depression manner as the standard manner of pressing the strings, to a second string-depression manner that is determined based on the recommended capotasto position, so that the player is able to easily play each chord in the second string-depression manner; and wherein said display step displays the second string-depression manner obtained by said determining step.

* * * * *